United States Patent
Fanning

(10) Patent No.: US 6,615,308 B1
(45) Date of Patent: Sep. 2, 2003

(54) METHOD AND APPARATUS FOR REGULATING WRITE BURST LENGTHS

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/458,546

(22) Filed: Dec. 9, 1999

(51) Int. Cl.[7] .............................................. G06F 12/00
(52) U.S. Cl. ...................... 711/105; 711/147; 711/154; 710/35; 710/60
(58) Field of Search .............................. 710/31, 33, 34, 710/35, 46, 60, 112, 116, 123, 105; 711/147, 151, 152, 154

(56) References Cited

U.S. PATENT DOCUMENTS

| | | | | | |
|---|---|---|---|---|---|
| 5,224,213 A | * | 6/1993 | Dieffenderfer et al. | ....... | 710/53 |
| 5,359,593 A | * | 10/1994 | Derby et al. | ................. | 370/234 |
| 5,918,072 A | * | 6/1999 | Bhattacharya | ................ | 710/35 |
| 5,948,081 A | * | 9/1999 | Foster | ......................... | 710/40 |
| 6,014,384 A | * | 1/2000 | Weberhofer | ........... | 370/395.43 |
| 6,128,233 A | * | 10/2000 | Yu et al. | ................. | 365/189.02 |
| 6,256,684 B1 | * | 7/2001 | Klein | ........................... | 710/35 |
| 6,282,208 B1 | * | 8/2001 | Bowcutt et al. | ............ | 370/486 |
| 6,393,500 B1 | * | 5/2002 | Thekkath | ...................... | 710/35 |
| 6,397,287 B1 | * | 5/2002 | Brown et al. | ................ | 710/305 |
| 6,411,946 B1 | * | 6/2002 | Chaudhuri | .................... | 706/21 |

FOREIGN PATENT DOCUMENTS

GB     EP 1043902 A2 * 11/2000 ............ H04Q/7/22

* cited by examiner

Primary Examiner—Do Hyun Yoo
Assistant Examiner—Christian P. Chace
(74) Attorney, Agent, or Firm—Blakely, Sokoloff, Taylor & Zafman LLP

(57) ABSTRACT

In one embodiment, monitoring data traffic through a memory controller; and dynamically and automatically selecting a burst length for data transactions through a memory controller in response to the monitored data traffic.

11 Claims, 6 Drawing Sheets

METHOD AND APPARATUS FOR REGULATING WRITE BURST LENGTHS

BACKGROUND OF THE INVENTION

1. Field of the Invention

The invention relates generally to data transfer, and in particular to data transfer through a bus or a system controller.

2. Discussion of the Related Art

As workstation and server systems use more and more DRAM memory, the physical and logical lengths of the channels between the system memory controller and the DRAM devices themselves are becoming longer. As a result, the transit time of data between the memory controller and the DRAMs is increasing. When this happens on a system that uses a single channel for both read and write data, "turning the bus around" between the read data and the write data results in more substantial periods during which no data is valid at one end of the chain or the other. This is a waste of DRAM channel bandwidth.

The traditional technique for minimizing wasted bandwidth is to enforce long write bursts and long read bursts. This increases the amount of time that data is being pipelined through the channel and decreases the amount of time that is spent in transition.

Unfortunately, a memory controller that solves the problem of wasted bandwidth in this way is quickly saddled with the problem of elevated system memory read latency, because the performance of a device demanding data is often degraded more by latency increase than by memory bandwidth deficiencies.

So far, this problem has been solved with static methods that pre-specify the minimum size of the write burst. However, optimizing the system for low latency (worst case of 2 additional cycles) can cause system bandwidth to be degraded to 40% of the theoretical bandwidth; conversely, optimizing for only a 28% bandwidth loss can cause a latency hit of up to 8 cycles. Both of these circumstances are aggravated in the worst case: when the memory controller is receiving requests that cause it to perform the same number of DRAM write transactions as DRAM read transactions.

SUMMARY OF THE INVENTION

In one embodiment, monitoring data traffic through a memory controller; and dynamically and automatically selecting a burst length for data transactions through a memory controller in response to the monitored data traffic is disclosed.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
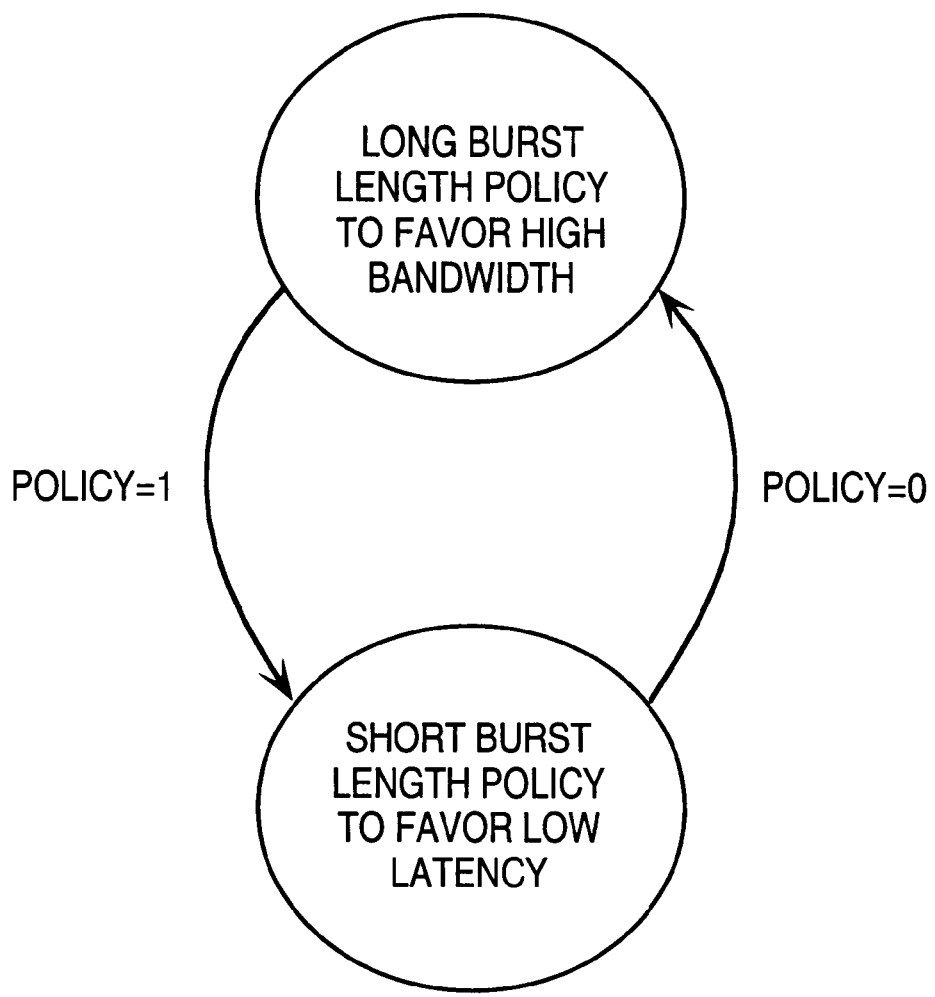
FIG. 1 shows an embodiment of a state machine for selecting burst length policy.

A method and apparatus for regulating write burst lengths is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The method and apparatus described herein provide a way to modify data traffic through a controller in response to monitored data traffic patterns, so that the burst length for data transactions through a controller will be optimized to increase the overall efficiency of the data transfer through the controller. The burst length is the amount of data that travels through a controller during a given type of transaction, such as a write transaction, for example. When a processing system transitions from performing write transactions to performing read transactions, the system has to wait for the controller to finish the outstanding write transactions before it can begin the read transactions. The total waiting time therefore can be reduced by reducing the number of transitions from write to read or from read to write. The number of transitions for a given workload can be reduced by increasing the burst length.

However, there are times when using a large burst length is not as effective as having a smaller burst length. For example, if the number of write transactions performed by the system is much larger than the number of read transactions, or if there are not very many total data transactions, then the bursts should be small in order to reduce the latency, or waiting time, for a given transaction to go through the controller. The low bandwidth or small numbers of bus turnarounds in these situations make the efficiency of the controller less important than the latency.

An advantage of the method and apparatus disclosed herein is dynamically selecting a write burst length to increase the efficiency of the controller, or bus. This advantage is illustrated in FIG. 1, which shows a state machine for selecting the burst length policy for the bus. If the number of read and write transactions are approximately equal, the state machine selects a long burst length policy that favors a high bandwidth. In this case, the total transition time from read to write and write to read is reduced, thus increasing the efficiency of the bus. The state machine continues to monitor the data traffic through the bus. If the overall number of data transactions becomes low, or if the number of write transactions is much larger than the number of read transactions (or if the number of read transactions is much larger than the number of write transactions), then the state machine selects a short burst length policy that favors a low latency, or waiting time, for data going through the bus. Otherwise, the state machine maintains the previous burst length policy.

Thus, the method and apparatus dynamically selects and alters the burst length as a function of the amount and types of data transactions through the bus. The performance and efficiency of the bus is therefore greater than the performance and efficiency of a conventional bus that cannot change the burst length of data transactions through the bus.

Figure 2:
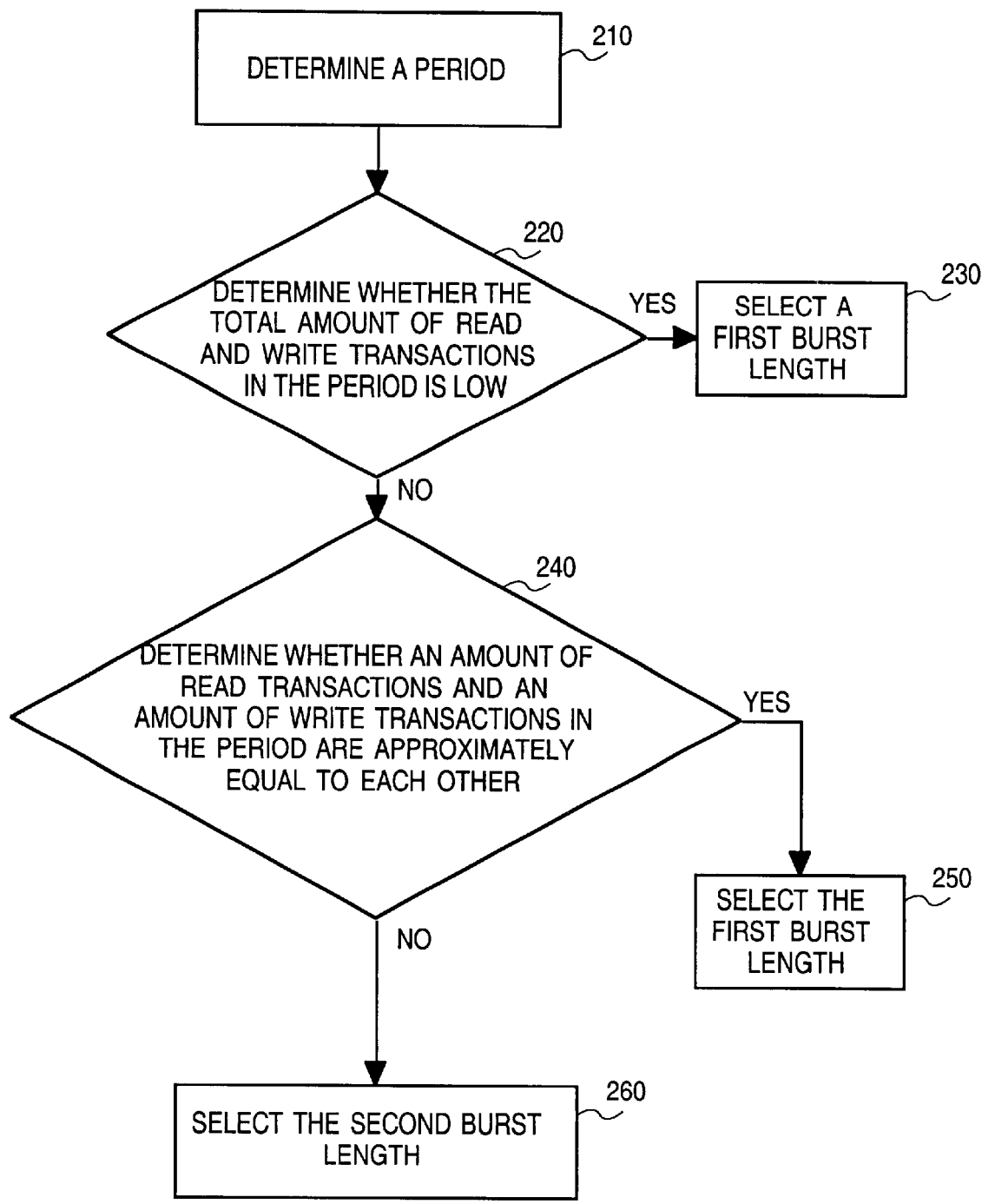
FIG. 2 shows an example of a method for selecting burst length.

In one embodiment, a method for selecting a burst length for data transactions through a bus is shown in FIG. 2. In one embodiment, the selected burst length is a first burst length or a second burst length, the first burst length being smaller than the second burst length.

The method determines a period 210 to monitor the data traffic through the bus. The method may include selecting the burst length by determining whether the total amount of read and write transactions is low, step 220, and if the total amount is low, selecting the first burst length, step 230.

If the total amount of read and write transactions is not low, the method may determine whether an amount of read transactions and an amount of write transactions in the period are approximately equal to each other, step 240. If the amount of read transactions is approximately equal to the amount of write transactions, the first burst length is selected, step 250. If the amount if read transactions is not approximately equal to the amount of write transactions, the second burst length is selected, step 260.

Figure 3:
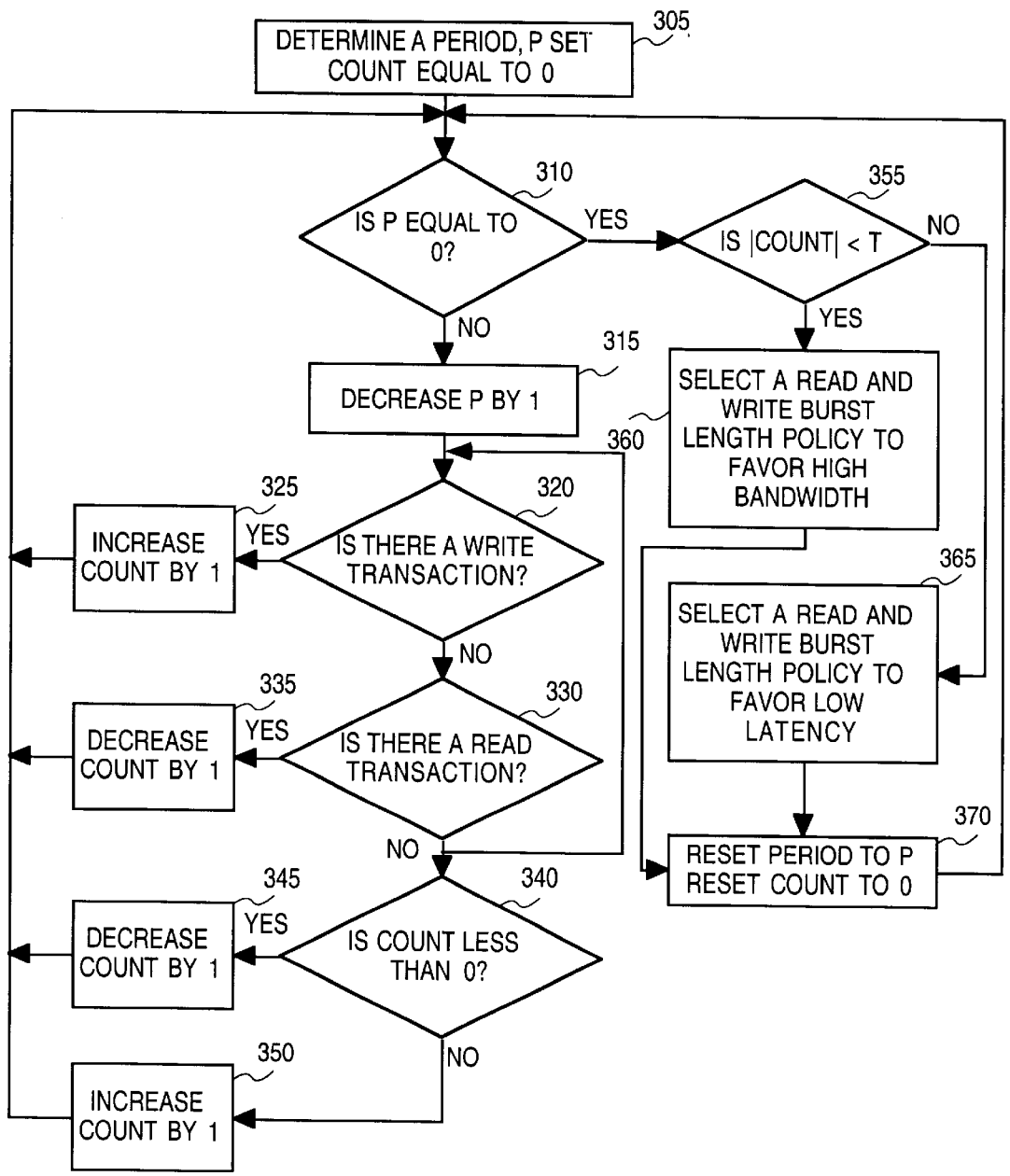
FIG. 3 shows another example of a method for selecting burst length.

An example of a process to perform the method of FIG. 2 is shown in FIG. 3. A period is determined, a number P is set based on the period, and a count is set to zero, step 305. In one embodiment, the period is a function of the total number of data transactions through the bus. Alternatively, the period may be related to a number of cycles, or to a period of time. The method then determines whether P is equal to zero, step 310. If P is not zero, then P is decreased by one, step 315.

In this embodiment, the method may determine whether an amount of read transactions and an amount of write transactions in the period are approximately equal. This may be done by incrementing a count for each write transaction, decrementing a count for each read transaction, and determining whether the absolute value of the count is less than a threshhold. The method determines whether a write transaction has been performed, step 320. If so, then the count is increased by one, step 325, and returns to step 310. Otherwise, the method determines whether a read transaction has been performed, step 330. If a read transaction has been performed, the method decreases the count by one, step 345, and returns to step 310.

If there is no read or write transaction, and if P is a function of the total number of data transactions, then the method returns to step 320. Otherwise, the method determines if the count is less than zero, step 340. If so, then count is decreased by one, step 345, and the method returns to step 310. Otherwise, count is increased by one, step 350, and the method returns to step 310. Step 340 provides one embodiment for determining whether a small number of data transactions are going through the bus. In an alternative embodiment, the method may count the number of cycles in which no data transaction has occurred. If a small number of data transactions, relative to the number of cycles in the period, have occurred, then the burst length should be small.

After the period has expired, when P is equal to zero, the method determines what the burst length policy of the next period will be. The method determines whether the absolute value of the count is less than a threshhold number, step 355. The threshhold number is used to determine whether the write transactions for the given period are approximately equal to the read transactions. For example, if the threshhold value T is 4, and there are three more write transactions than read transactions, then the absolute value of count will be less than T. Therefore, the method determines that the number of read and write transactions are approximately equal for this example.

If the absolute value of count is less than T, then the method selects the read and write burst length policy to favor a high bandwidth, step 360. Otherwise, the method selects the burst length policy to favor low latency and low bandwidth, step 365. The method then goes from either step 360 or step 365 to step 370, where P and count are reset, and the traffic for the next period is monitored by returning to step 310.

Figure 4:
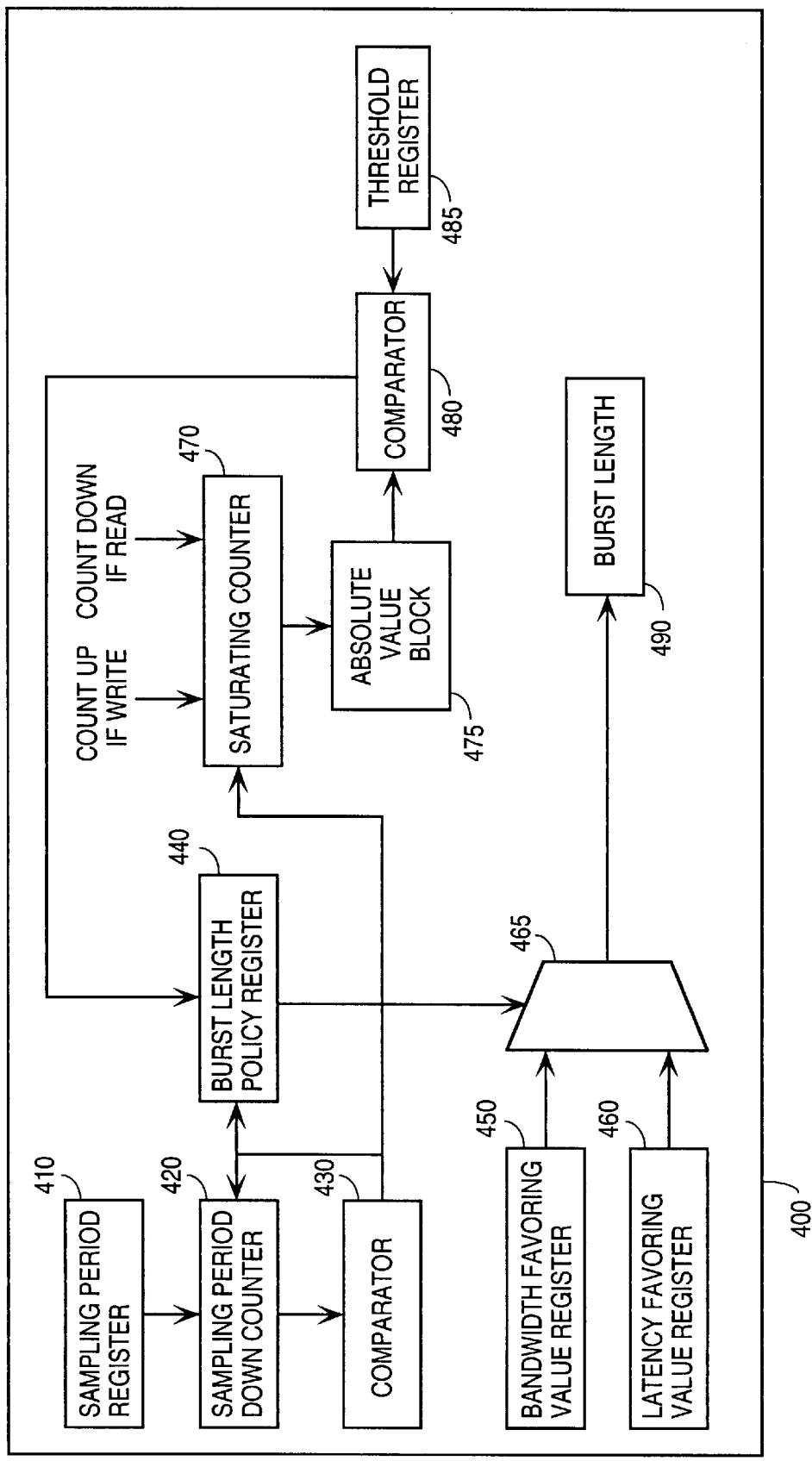
FIG. 4 is an embodiment of an apparatus for selecting burst length.

FIG. 4 shows a block diagram of one embodiment an apparatus 400 for performing the method shown in FIG. 3. Sampling period register 410 stores the sampling period value for monitoring the data traffic through the bus. This period is loaded into the sampling period down counter 420 at the beginning of the period. For each cycle in the period, the comparator 430 compares the sampling period value P with the number zero. If P is not equal to zero, the down counter 420 decreases P, and the saturating counter 470 receives an instruction to add one or subtract one from a count stored in the saturating counter 470. This instruction may depend on whether a write or a read transaction is performed during the current cycle. The instruction to count up or down may also depend on whether neither a read nor a write transaction has occurred during the current cycle.

The value in the saturating counter 470 is loaded into absolute value block 475, where the absolute value of the count is taken. The block 475 loads the absolute value of the count into comparator 480. The comparator 480 also receives a value from the threshhold register 485. When the period has ended, comparator 430 enables the comparator 480 to load a value into register 440.

If the value from block 475 is less than the value from threshhold register 485, the comparator 480 loads a first number into burst length policy register 440. Otherwise, comparator 480 loads a second number into register 440. In one embodiment, the first number is associated with a burst length policy that favors high bandwidth, and the second number is associated with a burst length policy that favors low latency and low bandwidth.

In this embodiment, the policy is determined by taking the absolute value of the value in the saturating counter register and comparing it to a configurable threshhold register value to determine whether or not the read-to-write ratio falls within the area where the controller is forced to sacrifice latency in order to achieve acceptable DRAM bandwidth. Thus, the apparatus 400 modifies the length of DRAM write bursts in order to balance the need for low read latency against the need to avoid wasting DRAM bus bandwidth. The apparatus 400 balances these two concerns against one another by dynamically adjusting the DRAM write burst length according to the ratio of read and write requests received by a memory controller. If the read and write transaction rates are relatively balanced, then the apparatus 400 sacrifices memory latency in order to achieve reasonable bandwidth utilization. If the number of reads outweighs the number of writes or the number of writes outweighs the number of reads by a given threshhold, then the device sacrifices a negligible amount memory bandwidth to reduce memory latency.

When the burst length policy register 440 contains the first number, the multiplexer 465 is enabled to allow the value from the high bandwidth favoring register 450 to determine the burst length 490. When the register 440 contains the second number, the multiplexer 465 is enabled to allow the value from the low latency favoring value register to determine the burst length.

The apparatus 400 repeats this process for another period when the value of P in comparator 430 is equal to zero by resetting the sampling period down counter 420 and clearing the saturating counter 470 back to zero.

Figure 5:
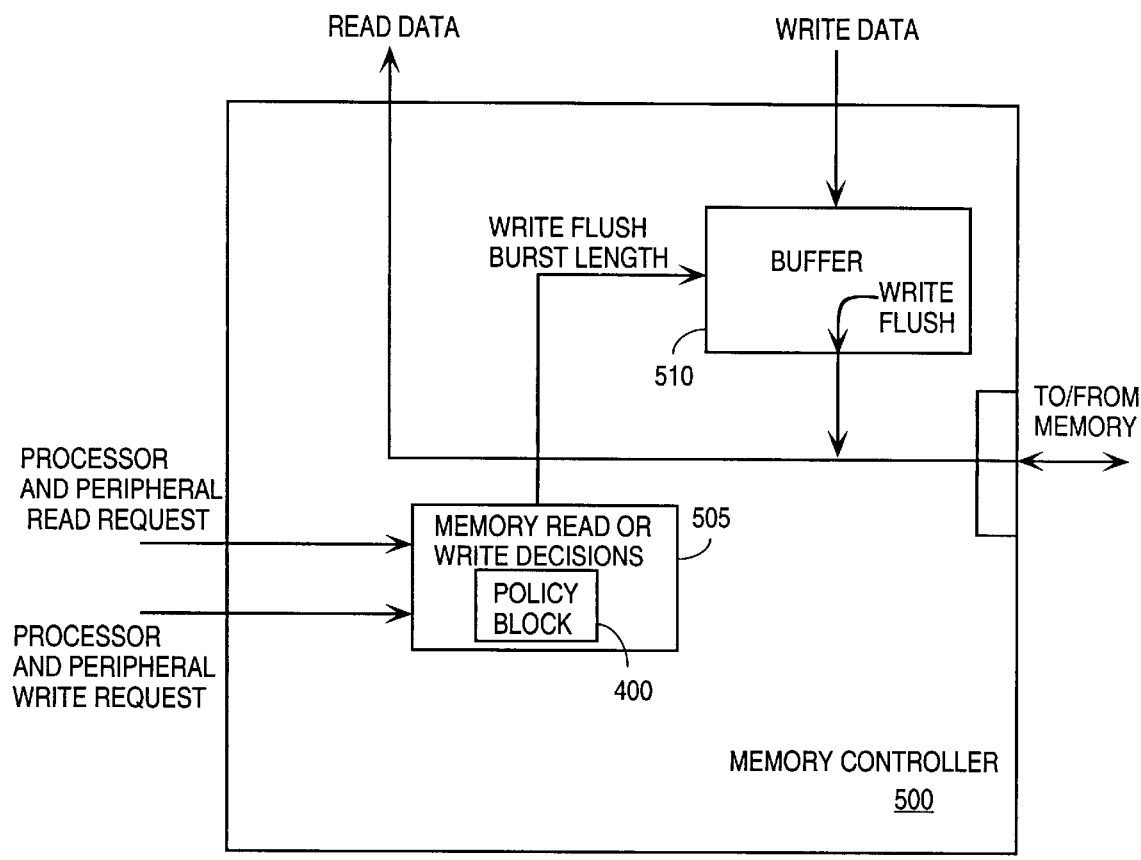
FIG. 5 shows an embodiment of a system controller with an apparatus for selecting burst length.

FIG. 5 shows an embodiment of a memory controller 500 implementing the policy apparatus 400 shown in FIG. 4. The memory controller 500 receives read requests and write requests from a processor and peripheral devices. The read and write requests go into memory read or write decision block 505. The decision block 505 decides whether a read transaction or a write transaction will be performed. Block 505 also contains policy block 400. The read and write requests are used by policy block 400 to increment or decrement the saturating counter 470 shown in FIG. 4. The write flush burst length is determined by policy block 400 and is sent to buffer 510. The buffer 510 receives write data and stores the write data until the amount of write data in the buffer is equal to the write flush burst length set by the policy block 410. Then, buffer 510 flushes the accumulated write data into the system memory.

Figure 6:
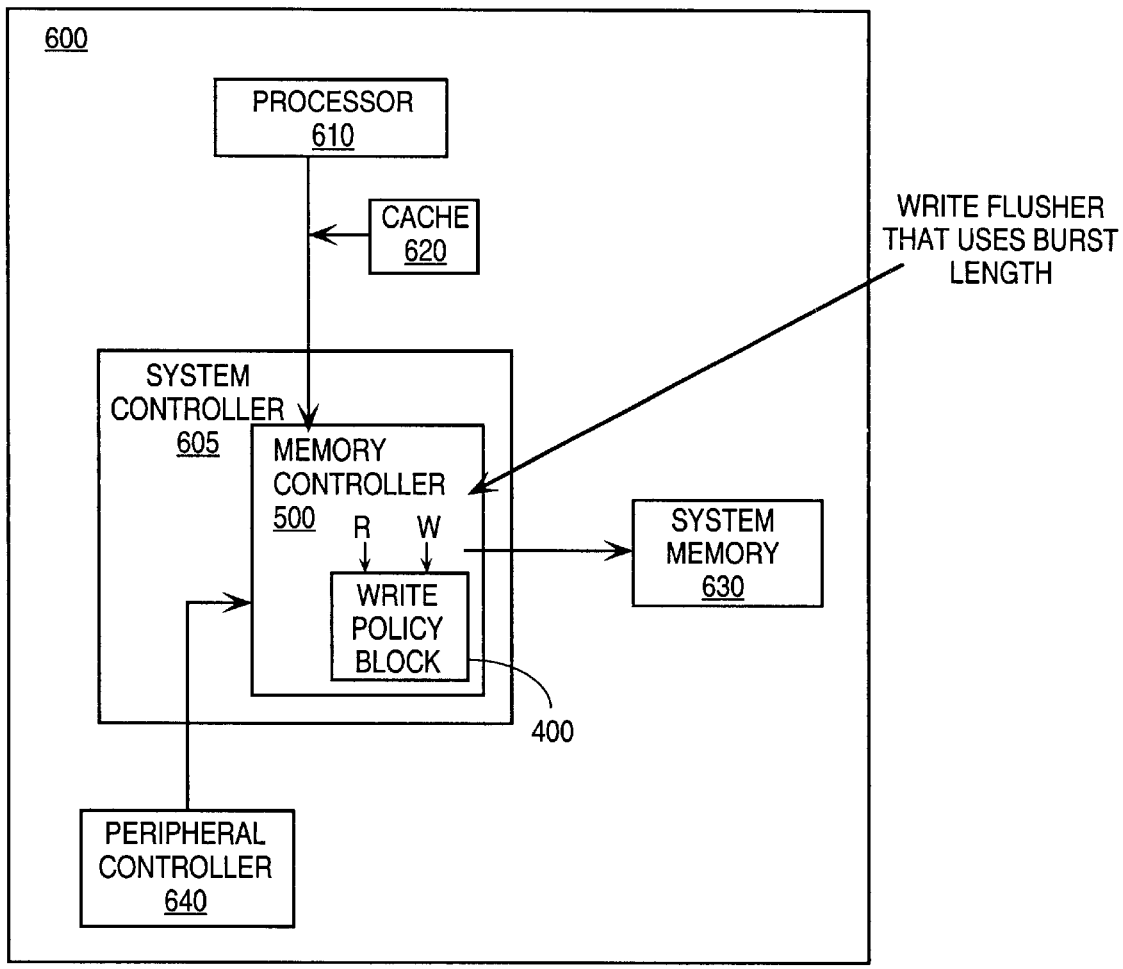
FIG. 6 is an embodiment of a processing system with a system with a system controller that can select burst length.

FIG. 6 shows an embodiment of a processing system 600 that implements the method and apparatus of FIGS. 2, 3, and 4. The bus is located in system controller 605, which contains memory controller 500 including write flush policy block 400. A processor 610, cache memory 620, system memory 630, and peripheral controller 640 transfer data to one another through controller. The burst length for the data transactions between these components is selected by the method and apparatus for selecting a burst length for data transactions through a bus. The apparatus and method may be used with several types of busses, including a DRAM bus, a processor bus, and a peripheral device bus.

This invention enhances performance of a memory controller by intelligently and dynamically changing the memory controller's write flushing policy in order to favor either latency or bandwidth, whichever is more critical depending on system conditions.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

What is claimed is:

1. A method, comprising:
   monitoring data traffic through a memory controller;
   dynamically and automatically selecting a burst length for data transactions through a memory controller in response to the monitored data traffic, the burst length including a first burst length and a second burst length; and
   selecting the first burst length if a total amount of data transactions is below a predetermined level,
   wherein if the total amount of data transactions is equal or above the predetermined level, the method further comprises
      determining whether an amount of read transactions and an amount of write transactions in the period are approximately equal;
      if the amount of read transactions is approximately equal to the amount of write transactions, selecting the second burst length; and
      if the amount if read transactions is not approximately equal to the amount of write transactions, selecting the first burst length.

2. The method of claim 1 wherein determining whether an amount of read transactions and an amount of write transactions in the period are approximately equal comprises:
   incrementing a count for each write transaction;
   decrementing a count for each read transaction; and
   determining whether the absolute value of the count is less than a threshhold.

3. The method of claim 2 wherein the memory controller is selected from the group comprising:
   a DRAM controller;

a processor controller; and a peripheral device controller.

4. A computer readable medium having instructions which, when executed by a processing system, cause the system to perform a method, the method comprising:

monitoring data traffic through a memory controller;

dynamically and automatically selecting a burst length for data transactions through a memory controller in response to the monitored data traffic, the burst length including a first burst length and a second burst length; and selecting the first burst length if a total amount of data transactions is below a predetermined level, wherein if the total amount of data transactions is equal or above the predetermined level, the method further comprises determining whether an amount of read transactions and an amount of write transactions in the period are approximately equal;

if the amount of read transactions is approximately equal to the amount of write transactions, selecting the second burst length; and if the amount if read transactions is not approximately equal to the amount of write transactions, selecting the first burst length.

5. The medium of claim 4 wherein the instructions, when executed, determine whether an amount of read transactions and an amount of write transactions in the period are approximately equal by:

incrementing a count for each write transaction;

decrementing a count for each read transaction; and determining whether the absolute value of the count is less than a threshhold.

6. The medium of claim 5 wherein the memory controller is selected from the group comprising; a DRAM controller; a processor controller; and a peripheral device controller.

7. An apparatus, comprising:

means for monitoring data traffic through a memory controller;

means for dynamically and automatically selecting a burst length for data transactions through a memory controller in response to the monitored data traffic, the burst length including a first burst length and a second burst length; and means for selecting the first burst length if a total amount of data transactions is below a predetermined level, wherein if the total amount of data transactions is equal or above the predetermined level, the apparatus further comprises means for determining whether an amount of read transactions and an amount of write transactions in the period are approximately equal;

means for selecting the second burst length if the amount of read transactions is approximately equal to the amount of write transactions; and means for selecting the first burst length if the amount if read transactions is not approximately equal to the amount of write transactions.

8. The apparatus of claim 7 wherein said means for determining whether an amount of read transactions and an amount of write transactions in the period are approximately equal comprises:

means for incrementing a count for each write transaction;

means for decrementing a count for each read transaction; and means for determining whether the absolute value of the count is less than a threshhold.

9. An apparatus comprising:

a sampling period register to determine a period;

a saturating counter to count in response to read and write transactions in the period;

a comparator to provide an output indicating whether the read and write transactions in the period are approximately equal; and a burst length policy register to receive the output of the comparator and to generate a burst length policy enable signal in response to the output of the comparator.

10. The apparatus of claim 9 wherein:

the burst length policy enable signal has a first state associated with a first burst length, and a second state associated with a second burst length, wherein the bandwidth of the first burst length is smaller than the second burst length.

11. The apparatus of claim 10 further comprising:

a first burst length value register having a first value associated with the first burst length to output the first value when enabled;

a second burst length value register having a second value associated with the second burst length to output the second value when enabled; and a multiplexer to receive the burst length policy enable signal and to enable either the first burst length value register or the second burst length register in response to the burst length policy enable signal.

* * * * *